United States Patent [19]
Ishii et al.

[11] Patent Number: 5,456,068
[45] Date of Patent: Oct. 10, 1995

[54] AXLE DRIVING APPARATUS

[75] Inventors: Norihiro Ishii; Toshio Nagai; Hideaki Okada; Hidemi Harada, all of Amagasaki, Japan

[73] Assignee: Kanzaki Kokyukoki Mfg. Co., Ltd., Amagasaki, Japan

[21] Appl. No.: 246,264

[22] Filed: May 19, 1994

[30] Foreign Application Priority Data

Oct. 28, 1993 [JP] Japan .................................. 5-271034

[51] Int. Cl.⁶ .............................. F16D 39/00; F01B 3/00
[52] U.S. Cl. ................... 60/487; 91/505; 92/12.2; 92/57; 92/72
[58] Field of Search ................... 60/487; 91/505; 417/269; 92/12.2, 57, 72

[56] References Cited

U.S. PATENT DOCUMENTS

| | | | |
|---|---|---|---|
| 4,884,952 | 12/1989 | Kanamaru et al. | 92/12.2 X |
| 4,896,583 | 1/1990 | Lemke | 92/12.2 X |
| 4,899,541 | 2/1990 | Okada et al. | |
| 4,903,545 | 2/1990 | Louis et al. | |
| 4,914,907 | 4/1990 | Okada. | |
| 5,011,377 | 4/1991 | Sagawa et al. | 92/71 X |
| 5,156,576 | 10/1992 | Johnson. | |
| 5,163,293 | 11/1992 | Azuma et al. | 60/487 |
| 5,181,453 | 1/1993 | Kayukawa et al. | 92/12.2 |
| 5,201,692 | 4/1993 | Johnson et al. | |
| 5,253,576 | 10/1993 | Bethke | 60/487 X |

FOREIGN PATENT DOCUMENTS 370291  8/1963  Switzerland .............................. 60/487

*Primary Examiner*—Edward K. Look
*Assistant Examiner*—Hoang Nguyen
*Attorney, Agent, or Firm*—Sterne, Kessler, Goldstein & Fox

[57] ABSTRACT

An axle driving apparatus has in a housing a hydrostatic transmission with a variable displacement type hydraulic system having a slantingly movable swash plate. In one embodiment, the movable swash plate is manually slantingly operable. A leg member integrally extends from an inner wall of the housing, a lid for closing an opening of the housing, or a center section. The leg member has a support portion for supporting a shaft provided on an axis of rotation of the movable swash plate. Accordingly, the movable swash plate is suspended in the housing for slanting or pivoting movement.

21 Claims, 17 Drawing Sheets

5,456,068

AXLE DRIVING APPARATUS

BACKGROUND OF THE INVENTION

1. Field of the Invention

The present invention relates to an axle driving apparatus for driving a vehicle, and more particularly, the invention relates to a pair of displacement hydraulic systems where at least one of the systems is of a variable capacity type having a movable swash plate.

2. Description of Related Art

U.S. Pat. Nos. 4,914,907, 4,903,545, 5,156,576 and 5,201,692 disclose a type of axle driving apparatus, which houses in a common housing a hydrostatic transmission including a pair of displacement type hydraulic systems fluidly connected with each other and axles driven by the hydrostatic transmission. At least one of the displacement type hydraulic systems is of a variable displacement type having a movable swash plate in contact with heads of pistons fitted into a cylinder block. The pistons reciprocate and the movable swash plate slants with respect to the rotary axis of the cylinder block.

This type of movable swash plate is convex at a rear surface opposite to an abutting surface that abuts against the heads of the pistons. An inner surface of the housing facing the rear surface of the piston is made concave corresponding to the convex rear surface of the movable swash plate. A U-shaped thrust metal is positioned on the concave inner surface so that the rear surface of the swash plate is slantingly movable along a circular-arched guide surface of the thrust metal.

Since the movable swash plate is usually subjected to thrust from the piston, frictional resistance generated between the rear surface of the movable swash plate and the guide surface of thrust metal increases. Thus, the sliding resistance of the movable swash plate increases. Accordingly, a large force is necessary to operate the movable swash plate. Especially problematic is the case where the movable swash plate is spring biased to automatically return to a neutral position when an operation is stopped. In such case, when the sliding resistance is greater than the biasing force of the spring, the movable swash plate does not return to the neutral position. Further, the sliding resistance cannot be diminished merely by polishing the rear surface of movable swash plate, which contacts the thrust metal.

SUMMARY OF THE INVENTION

In accordance with the invention, an axle driving apparatus houses in a common housing a hydrostatic transmission and axles driven by the hydrostatic transmission. One of the pair of displacement type hydraulic systems comprising the hydrostatic transmission is of variable-capacitive type having a movable swash plate, which is operable, for example, manually operable to move the swash plate to slanted positions. A primary object of the invention is to provide legs for supporting the movable swash plate inside the housing, so that the movable swash plate is suspended in the housing. Thus, the sliding resistance is reduced when the movable swash plate is slantingly moved. Accordingly, the necessary operating force is reduced and the movable swash plate can easily return to the neutral position. Another object of the invention is to reduce processing costs and simplify construction of the movable swash plate in the housing.

BRIEF DESCRIPTION OF THE DRAWINGS

Preferred embodiments of the invention will be described in detail with reference to the following drawings in which like reference numerals refer to like elements and wherein.

DETAILED DESCRIPTION OF PREFERRED EMBODIMENTS

Figure 1:
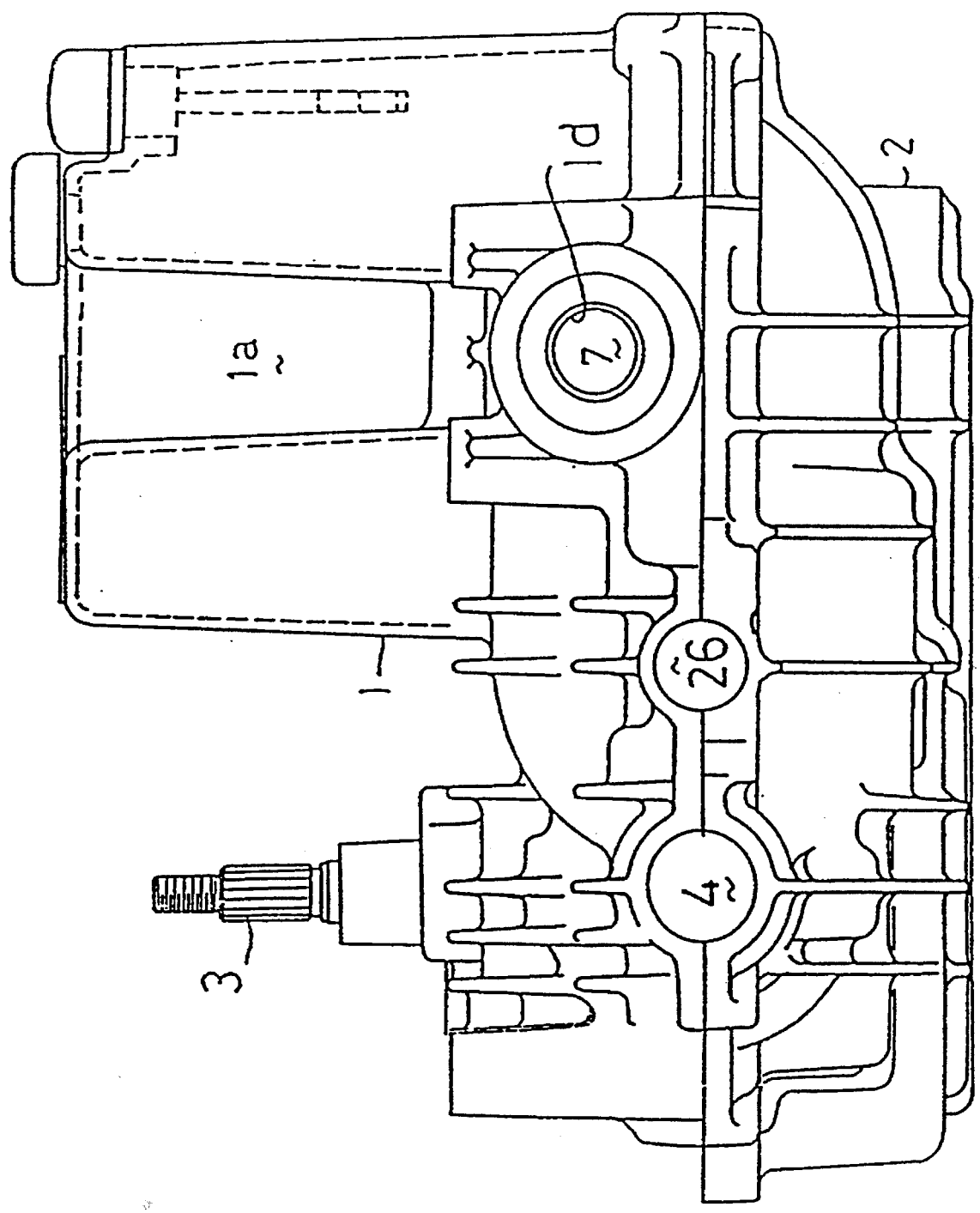
FIG. 1 is a side view of an axle driving apparatus.

FIGS. 1, 2, 3, 4 and 5 illustrate an axle driving apparatus. A housing of the axle driving apparatus is constructed by joining first and second halves, for example, an upper half 1 of the housing and a lower half 2 of the housing at joining surfaces, for example, horizontal joining surfaces to form a joint, respectively. An oil sump is formed in the housing. Positioned in the joint of upper half 1 and lower half 2 are axles including an output shaft 4 and a counter shaft 26, and bearings for receiving the output shaft 4 and the counter shaft 26. A pair of axles 7 are rotatably supported inside upper half 1 of the housing and apart from, for example, above the joint of upper half 1 and lower half 2 of the housing. The pair of axles 7 are differentially connected by a differential gear 23 in the housing and extend outwardly from the housing.

A projection, for example, an upward projection is formed at a portion of the upper half 1 of the housing in which differential gear 23 is disposed. This portion is used as an oil tank 1a. An input shaft 3 projects from the upper half 1 of the housing to input power from an engine (not shown) for driving a hydraulic pump of the variable displacement hydraulic system vertically and outwardly.

In a portion of the upper half 1 of the housing is mounted a center section 5 having substantially an L-shaped sectional side view. Center section 5 is positioned such that a surface, for example, an upper horizontal surface, of the center section 5 is in substantially the same plane or is parallel to a plane defined by the joint. The upper horizontal surface forms a pump setting surface 100, which is for rotatably and slidably mounting a cylinder block 16 of a hydraulic pump. In a plurality of cylindrical bores provided at cylinder block 16 are pistons 13, which move in a reciprocating manner through the use of, for example, springs. A movable swash plate 8, when viewed from one side, for example, a front side, is positioned in a substantially central position. Movable swash plate 8 has opening 8b, for example, a longitudinal opening through which input shaft 3 penetrates. Thrust bearings 8c are held at a surface, for example, a lower surface of the movable swash plate. Thrust bearings 8c form abutting surfaces against which pistons 13 abut respectively. From side surfaces of movable swash plate 8 project shaft portions 8a and 8a' along an axis of slanting movement of movable swash plate 8. The shaft portions 8a and 8a' are supported by supports in accordance with the present invention and are discussed in greater detail in the following discussion. The cylinder block 16 engages input shaft 3. The variable displacement type hydraulic pump is discussed above. Cylinder block 16 is rotated by input shaft 3, and movable swash plate 8 is moved to slant with respect to the rotary axis of cylinder block 16. Thus, a discharge amount and a discharge direction of oil from the hydraulic pump is changed.

A side surface, for example, a vertical side surface perpendicular to the upper horizontal surface of center section 5 forms a motor setting surface 101. A cylinder block 17 is rotatably, slidably mounted on the vertical side surface. Pistons 12 are fitted into a plurality of cylinder bores in cylinder block 17 for reciprocating movement respectively. A head of each piston 12 abuts against a contact surface (or a thrust bearing surface) of a fixed swash plate 37. Fixed swash plate 37 is fixedly sandwiched substantially between upper half 1 and lower half 2. Cylinder block 17 engages with an output shaft 4 to comprise a fixing displacement type hydraulic motor. Within center section 5 is a closed circuit for connecting suction ports and discharge ports of the hydraulic pump and hydraulic motor, respectively, to circulate pressurized oil. Cylinder block 17 of the hydraulic motor receives the pressurized oil discharged from the hydraulic pump. Thus, output shaft 4 is capable of obtaining stepless output rotation to form a hydrostatic transmission.

Figure 4:
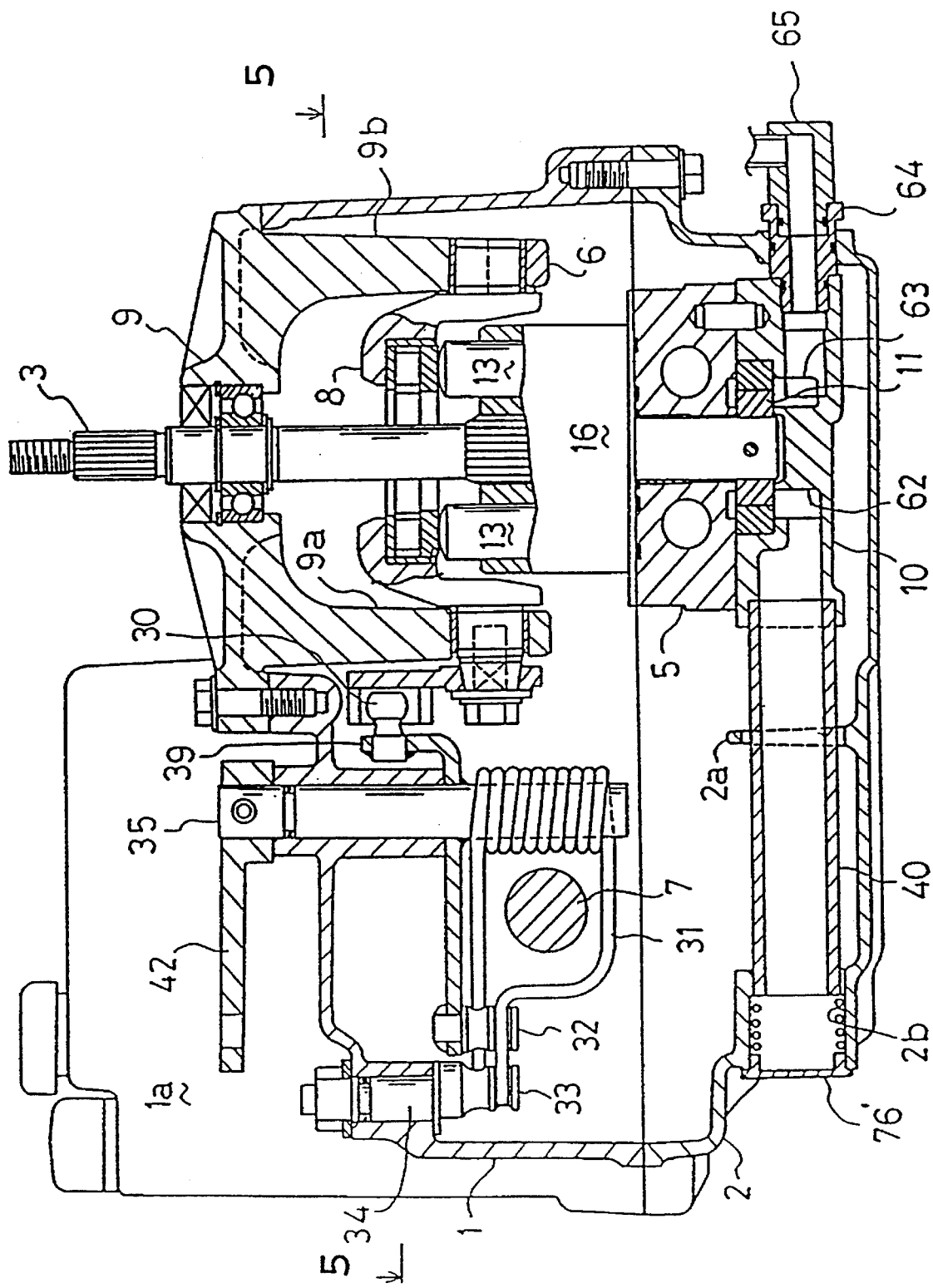
FIG. 4 is a sectional view taken in the direction of the arrows 4—4 in FIG. 2.
Figure 5:
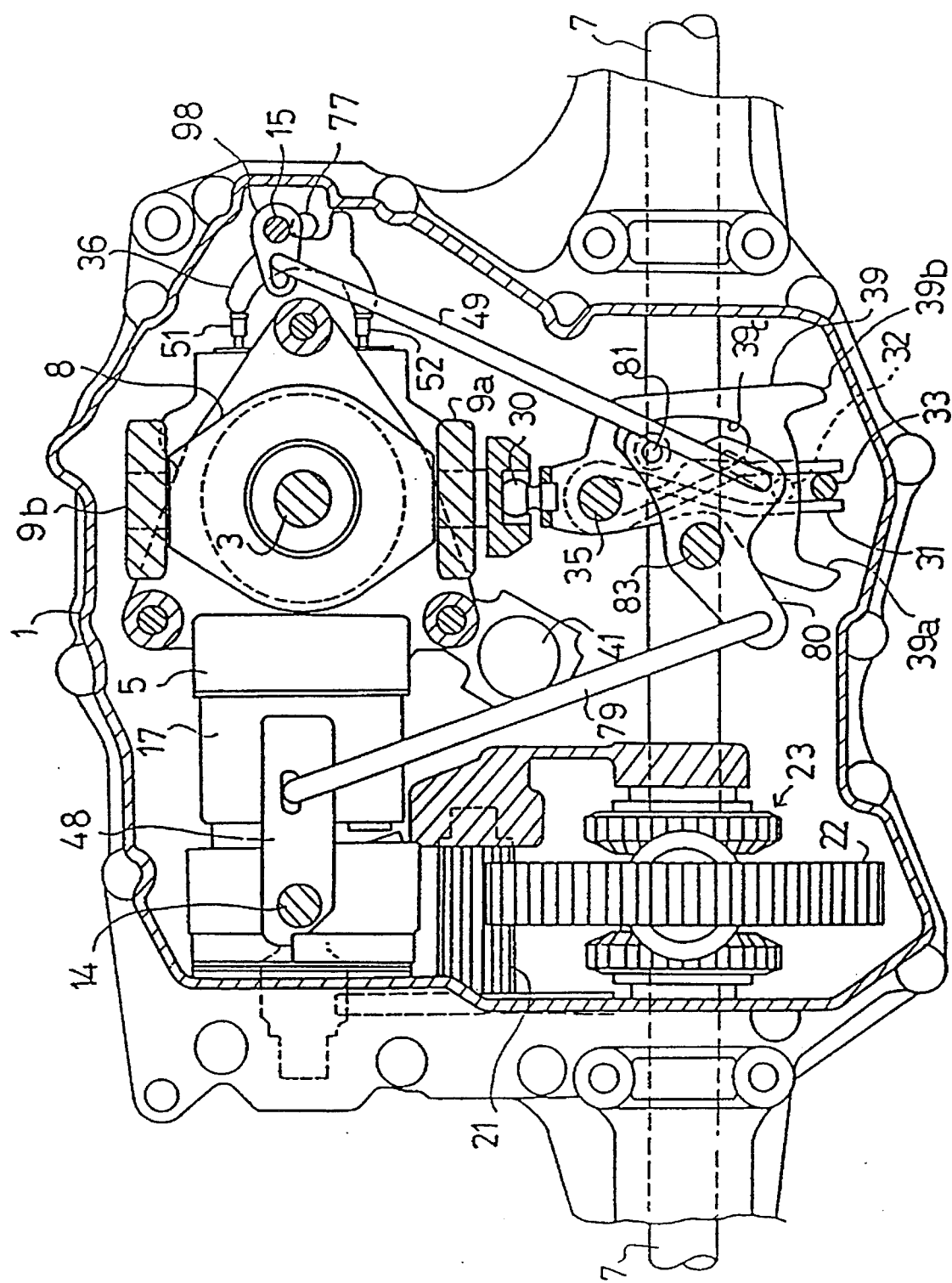
FIG. 5 is a sectional view taken in the direction of the arrows 5—5 in FIG. 4.

At a surface, for example, a lower, substantially horizontal surface, of center section 5 is attached a pump casing 10, into which a trochoid charge pump 11 is disposed. Charge pump 11 is driven by an end, for example, a lower end of input shaft 3 projecting away from, for example, in a downward direction from the lower surface of center section 5. As shown in FIG. 4, a suction oil passage at charge pump 11 is open into the oil sump through an oil filter 40. At the closed circuit of center section 5 are disposed a pair of check valves (not shown), which provide for connection with an operating oil supply circuit. Accordingly, the pressurized oil discharged from a discharge oil passage 63 of charge pump 11 opens a check valve to guide the pressurized oil from the operating oil supply circuit into the closed circuit. The pressurized oil discharged from discharge oil passage 63 is channelled through an oil take-out pipe 64 and a piping joint 65 for driving a hydraulic actuator (not shown) outside the housing. Oil returning from the hydraulic actuator is returned into the housing through a piping joint (not shown) and an oil return pipe (not shown) for being guided into the operating oil supply circuit at the center section 5. In addition, within pump casing 10 is a relief valve (not shown) for adjusting the discharge oil in charge pump 11 to a predetermined pressure. Oil filter 40 is a porous member of cylindrical shape and supported substantially, between the side wall of pump casing 10 and the inner wall of lower half 2 of the housing. When the oil filter 40 is checked, cleaned or replaced, a blind cover 76 is opened for extracting oil filter 40 from a fitting bore 2b at lower half 2 of the housing. Also, a support base 2a for supporting oil filter 40 projects from the inner bottom surface of the housing.

Figure 3:
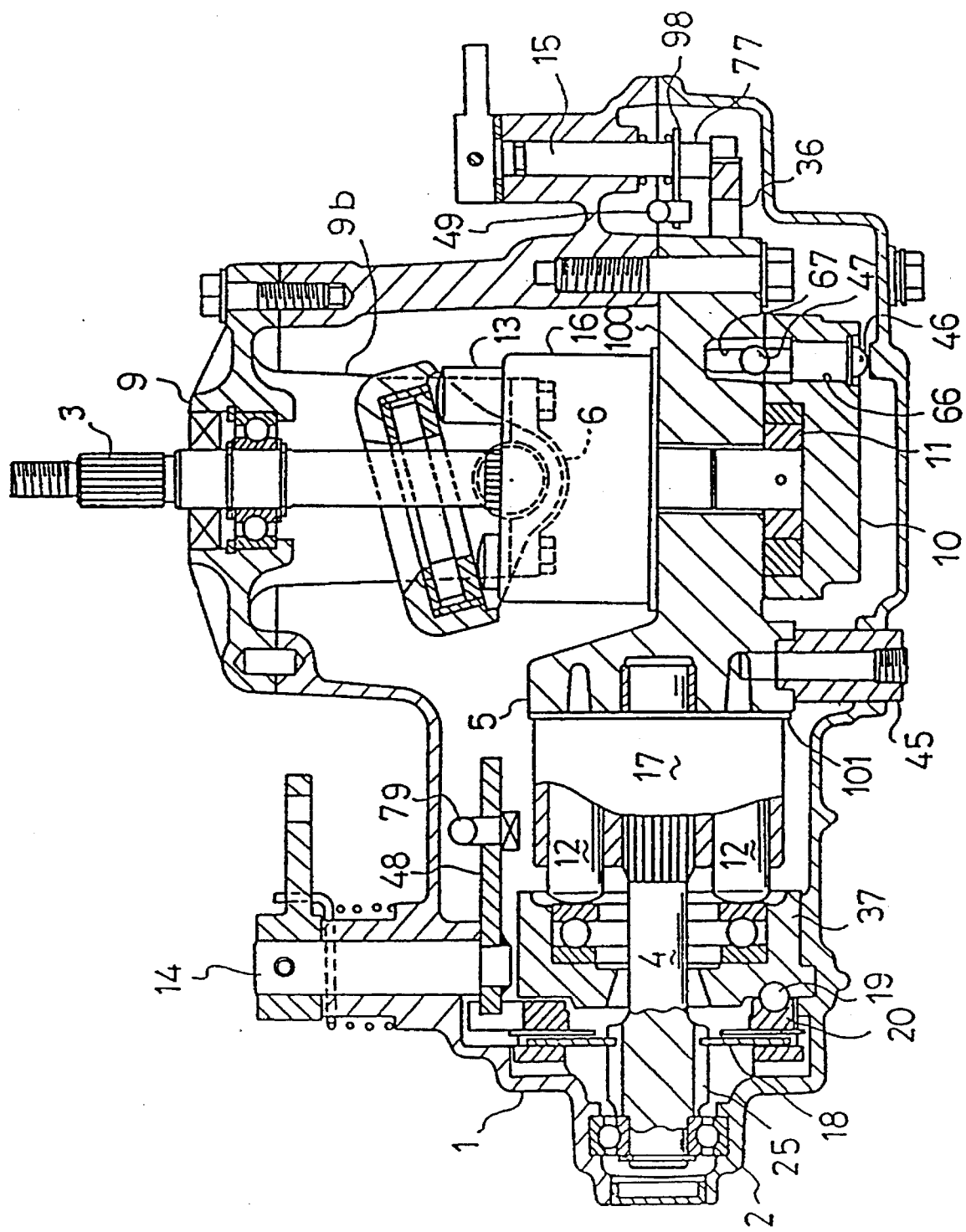
FIG. 3 is a sectional view taken in the direction of the arrows 3—3 in FIG. 2.

As shown in FIG. 3, an oiling pipe 45 is fitted onto the lower surface of center section 5 and projects at an end, for example, an extreme end outwardly from a surface, for example, a lower surface of lower half 2 of the housing and is closed. The oiling pipe 45 is for charging the operating oil into the closed circuit at center section 5 after building the hydraulic pump and hydraulic motor in the housing.

Within the center section 5 is a suction oil passage 66 for check valve 47. Check valve 47 is open so that the oil taken into the housing through an oil filter 46 is taken in from an oil passage 67 in a direction toward a negative pressure side of the closed circuit in center section 5.

Figure 2:
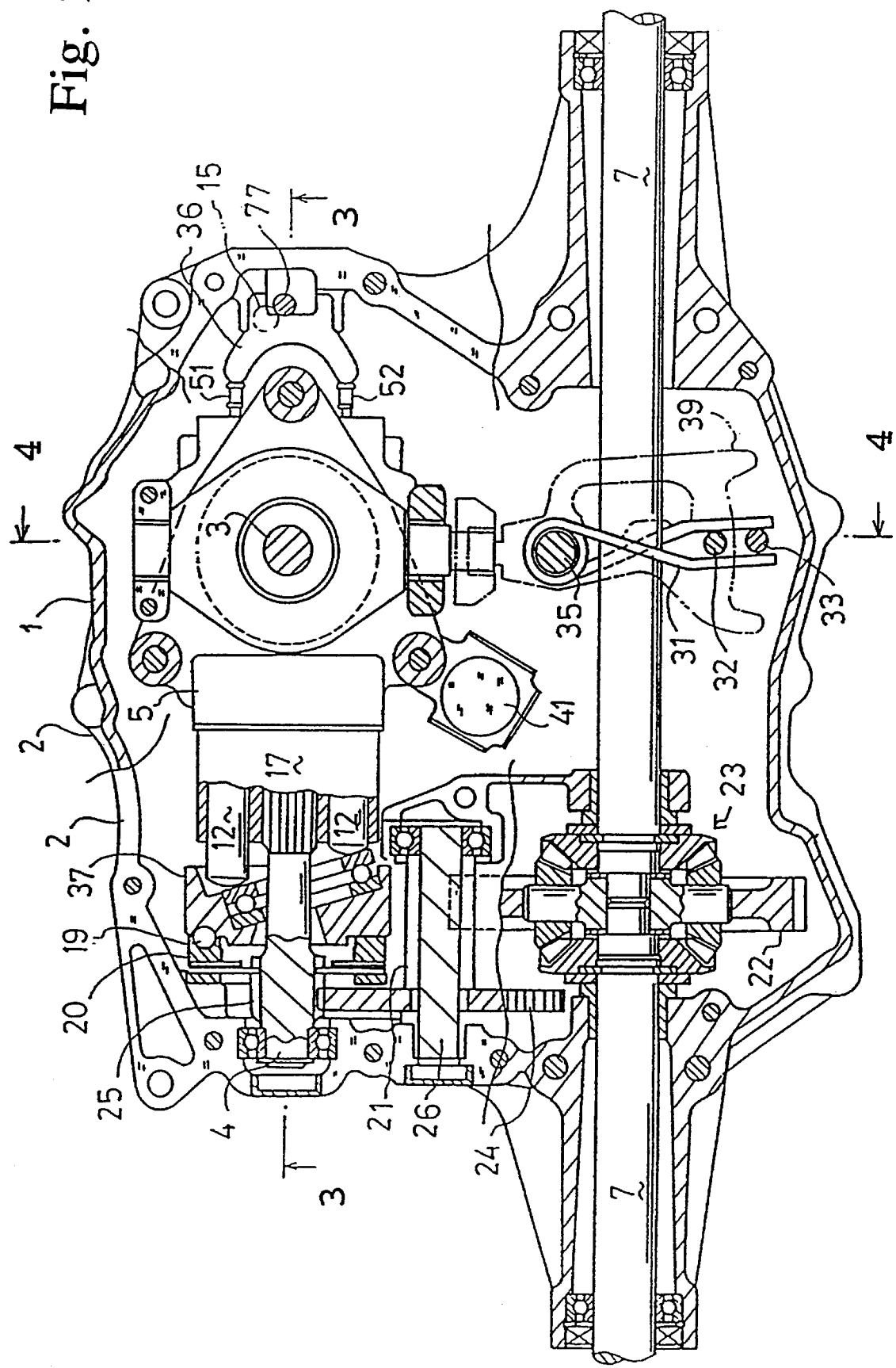
FIG. 2 is an exploded plan view of an upper half of a housing of the axle driving apparatus provided with the variable displacement type hydraulic system of the invention, and a partial sectional view thereof.

As shown in FIGS. 1 and 2, opening push rods 51 and 52 enable the pair of check valves (not shown), as discussed above, to be opened from a position outside of the housing or apart from center section 5. A C-shaped by-pass operating member 36 is disposed adjacent to the ends of opening push rods 51 and 52 for simultaneously pushing opening rods 51 and 52 to open both of the pair of check valves and open the closed circuit in the oil sump for freely rotating the hydraulic motor. A by-pass operating lever shaft 15 is rotated from the outside of the housing, so that a cam pin 77 fixed to lever shaft 15 pushes the rear of the by-pass operating member 36. The extreme end of lever shaft 15 simultaneously presses opening push rods 51 and 52 to open the pair of check valves, thereby enabling the hydraulic motor to rotate freely.

An arm 98 is fixed to a portion, for example, a lower portion of by-pass operating lever shaft 15. Arm 98 and an arm 48 at a side of a brake operating shaft 14, discussed in greater detail in the following discussion, are connected with each other through a rod 49. When the brake operating shaft 14 rotatably operates a brake actuator 20 to exert the braking action to output shaft 4, then, only when by-pass operating member 36 is operated simultaneously to put the pair of the check valves in an open state, are the valves adapted to automatically close. An indented gear 25 is provided at output shaft 4. Indented gear 25 engages with a larger diameter gear 24 on a counter shaft 26. A smaller diameter gear 21 on counter shaft 26 engages with a ring gear 22 at differential gear 23. Power generated from the hydraulic motor and input to ring gear 22 is transmitted to left and right axles 7 through differential gear 23. In an embodiment as discussed above, one end of counter shaft 26 is journalled to a side wall of fixed swash plate 37.

A braking device in accordance with an embodiment of the invention includes arm 48 fixed to brake operating shaft 14. Arm 48 engages with a projection provided at annular brake actuator 20. When brake actuator 20 is rotated around the axis of the output shaft 4, a cam mechanism 19 positioned substantially between fixed swash plate 37 and brake actuator 20 moves brake actuator 20 forward toward a braking friction plate 18 fixed to the output shaft 4. Braking friction plate 18 rotatable together with output shaft 4 is sandwiched substantial between brake actuator 20 and the housing, thereby exerting the braking action onto output shaft 4.

Figure 6:
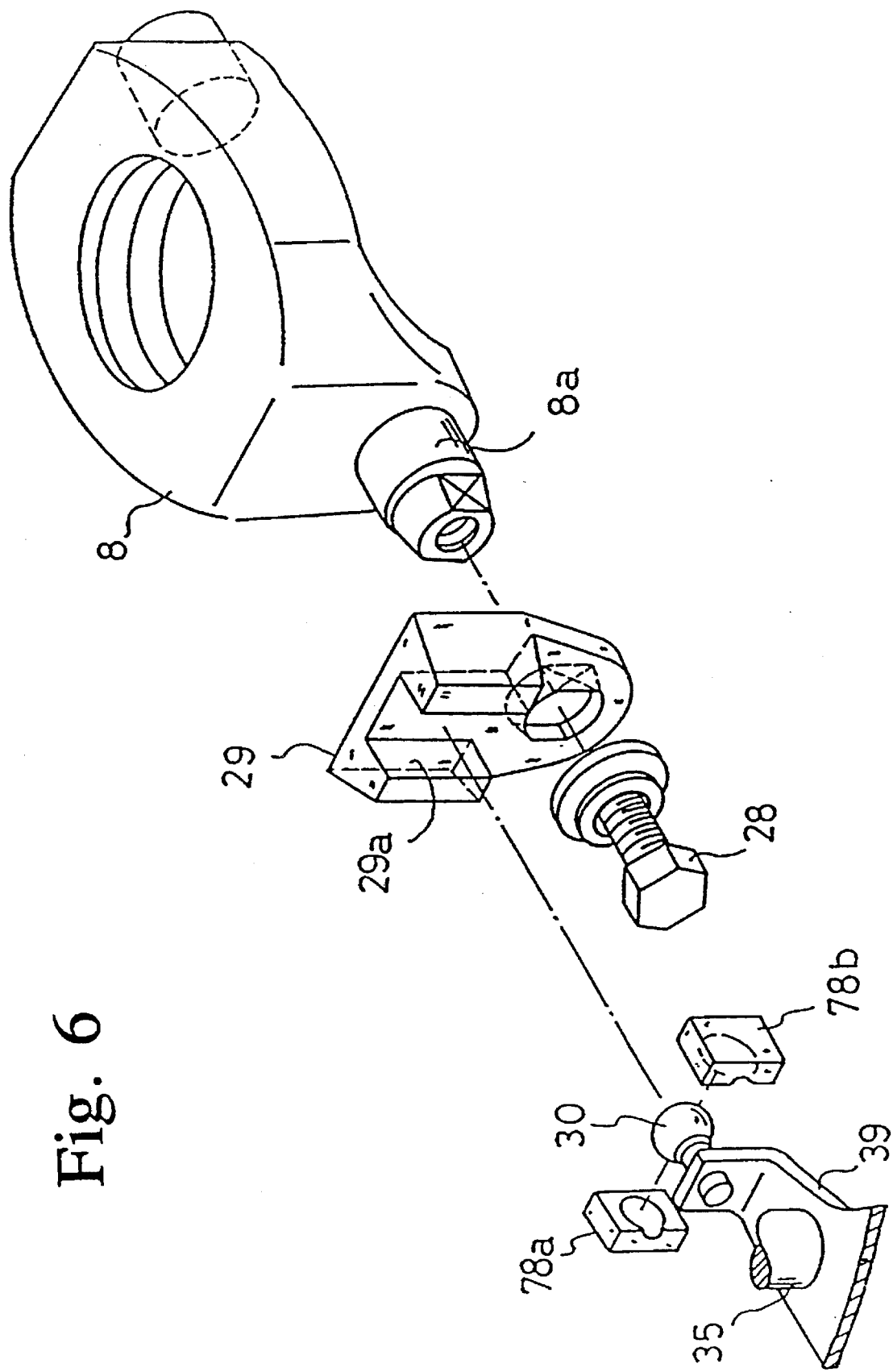
FIG. 6 is a perspective exploded view of a movable swash plate and a swinging arm.

The operating device for slantingly moving movable swash plate 8 will be discussed in the following. In particular, at a wall, for example, the upper wall of the upper half of the housing, a control shaft 35 is rotatably supported in a manner of extending parallel to the input shaft 3 for slantingly operating the movable swash plate 8. A control arm 42 is fixed to one end of control shaft 35 positioned exteriorly of the housing. Control arm 42 is connected to a manually operating member, such as a pedal or a lever on a vehicle (not shown). At another end of control shaft 35 extending into the housing is fixed an L-shaped swinging arm 39. At a portion of swinging arm 39 along control shaft 35 is fixed a ball 30 forming an engaging portion as shown in FIG. 6. Ball 30 engages through a pair of joint blocks 78a and 78b with an engaging portion 29a of an arm 29 fixed to the shaft portion 8a of a movable swash plate 8. Accordingly, when control shaft 35 pivots, for example, horizontally pivots ball 30 and joint blocks 78a and 78b, movable swash plate 8 pivots such that a surface, for example, an upper surface of movable swash plate 8 pivots between lateral and slanted orientations relative to a plane, for example, a horizontal plane and relative to the axis of rotation of cylinder block 16. Arm 29 can be of any type of shape, design, or construction, however, it is preferably of a length sufficient to achieve a link ratio and a slanting movement of movable swash plate 8 relative to the amount control shaft 35 pivots. For example, with the link ratio, if a long arm 29 is used, the movable smash plate 8 can be made to slant more with a smaller rotation of the control shaft 35. Arm 29 and control shaft 35 are in connection with each other, although not necessarily directly, within the housing. Thus, they are not affected by extraneous matter such as dust or rust.

A coiled torsion spring 31 is fitted onto control shaft 35 to return movable swash plate 8 to the neutral position once control shaft 35 is stationary, for example, is no longer pivoted. Torsion spring 31 has one end of the coil that extends on one side of axles 7, for example, on a side above axles 7, and extends in one direction for a portion of its length. Torsion spring 31 has another end of the coil that extends on another side of axles 7, for example, on a side below axles 7, and extends in another direction for a portion of its length different from the direction of the one end of the coil such that a portion of the ends are in a crossed position. The free ends of the coil are positioned on the sides of a fixing pin 33. Fixing pin 33 is fixed to the housing and is adjustable in a translational direction. A movable pin 32 is provided on swinging arm 39. Torsion spring 31 also serves as a guide for assembling axles in the housing, in particular, simplifying assembly of axles 7.

A neutral position adjusting screw 34 is for adjusting the neutral position of movable swash plate 8 outwardly. Adjusting screw 34 projects from upper half 1 of the housing. Fixing pin 33 is positioned eccentric to and at an end, for example, a lower end of neutral position adjusting screw 34. Accordingly, neutral position adjusting screw 34 is rotated in an appropriate direction to shift fixing pin 33 around neutral position adjusting screw 34 to enable adjustment of the neutral position of swinging arm 39. When swinging arm 39 pivots in one or another direction, one end of torsion spring 31 is expanded by way of movable pin 32 to apply to swinging arm 39 a return biasing force in the neutral direction. As a result, movable swash plate 8 is subject to a return force toward the neutral position of movable swash plate 8. Also, at one end of swinging arm 39 are a pair of engaging projections 39a and 39b for restricting rotation. Accordingly, when one of projections 39a and 39b abuts against fixing pin 33 during rotation of swinging arm 39, swinging arm 39 is stopped.

Swinging arm 39 includes a cam bore 39c for returning movable swash plate 8 to the neutral position when brake operating shaft 14 rotates to brake movement of output shaft 4. A pin 81 is fitted in cam bore 39c and fixed to an arm 80 rotatable around a relay shaft 83. When output shaft 4 is braked, a rod 79 connected to brake operating shaft 14 rotates arm 80 around relay shaft 83 and pin 81 rotates along the cam bore 39c. Accordingly, pin 81 forces movement of swinging arm 39 toward the neutral position by way of cam bore 39c. In a not-braking state, pin 81 is in a wider portion of cam bore 39c, thus swinging arm 39 can freely rotate therein. In addition, a magnet 41 attracts iron powder produced in the housing.

Figure 7:
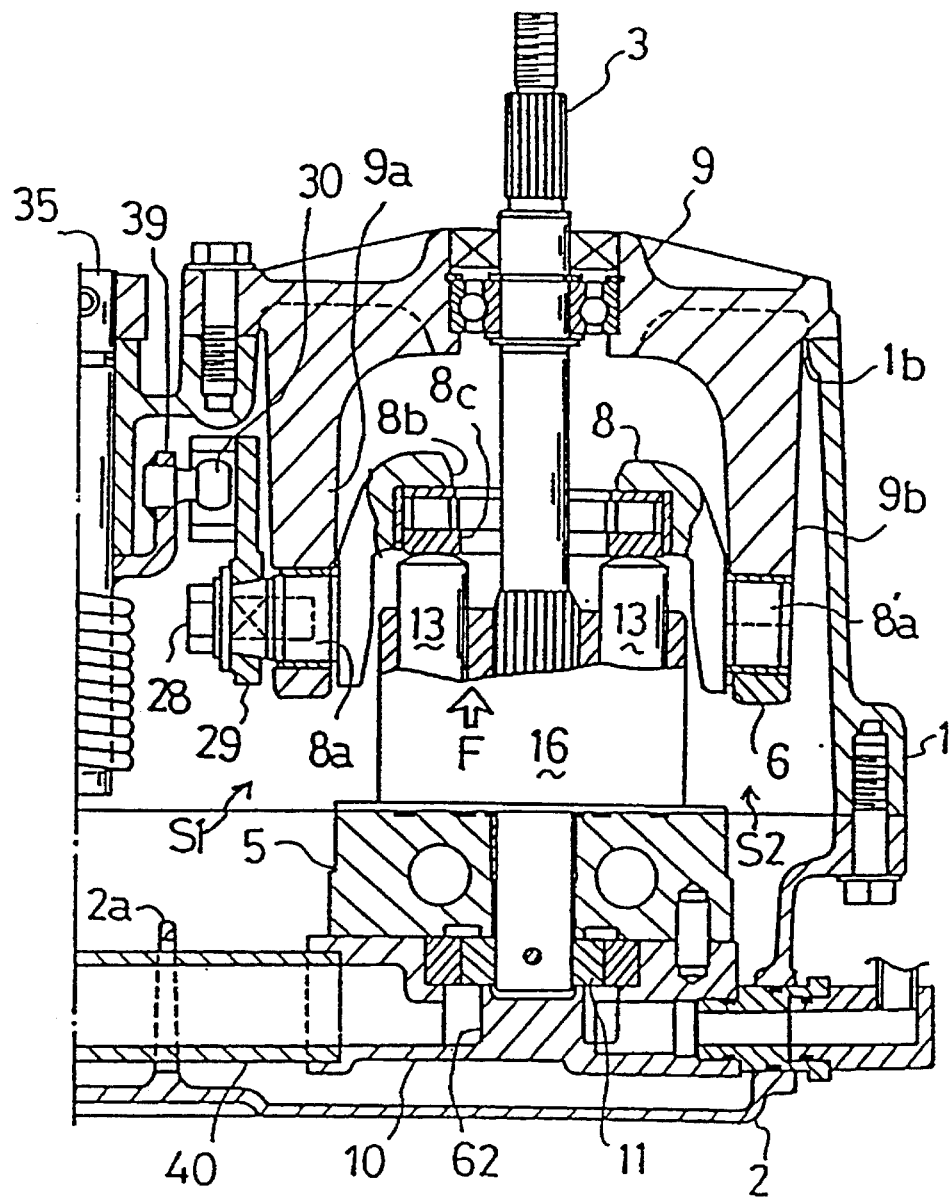
FIG. 7 is a sectional side view of an embodiment of the invention, which supports a movable swash plate by a lid member.
Figure 8:
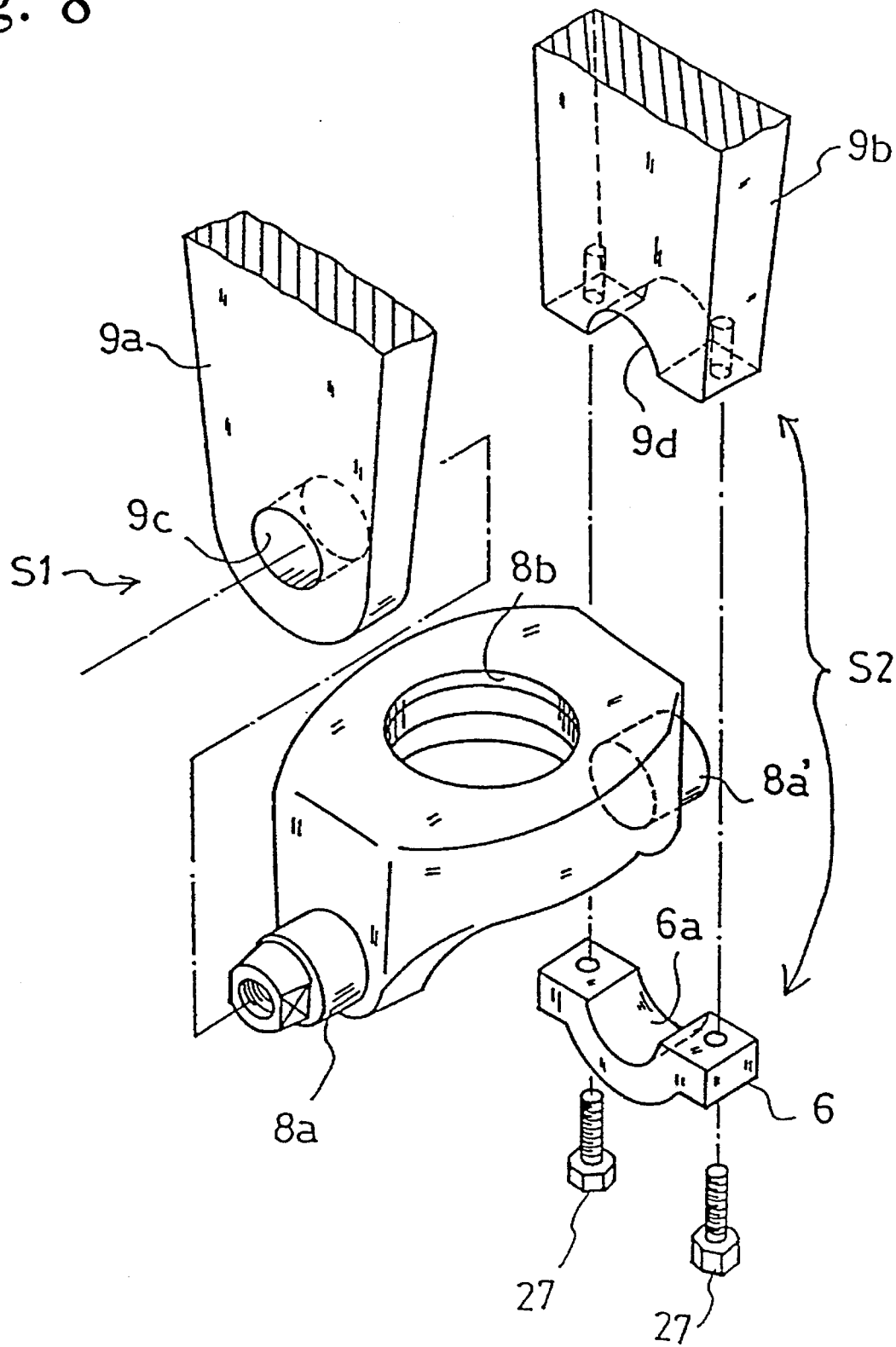
FIG. 8 is a perspective exploded view of a support shown in FIG. 7.

In an embodiment of the invention shown in FIGS. 7 and 8, movable swash plate 8 is supported by a lid 9 for closing an opening 1b at upper half 1 of housing. A hydraulic pump shaft 3 is journalled to a central portion of lid 9. A pair of legs 9a and 9b extend from lid 9 toward movable swash plate 8 along, for example, in parallel with a rotary axis of cylinder block 16. Legs 9a and 9b are integral with lid 9. Legs 9a and 9b have a portion coincident with shaft portions 8a and 8a'. A first support S1 and a second support S2 for rotatably supporting shaft portions 8a and 8a' are provided at legs 9a and 9b respectively. First support S1 includes a round bore 9c for inserting shaft portion 8a. Shaft portion 8a is greater in axial length than the thickness of bore 9c. An axial end of shaft portion 8a is fixed to arm 29. A substantially semicircular surface 9d for supporting shaft portion 8a' is formed at the lower surface of leg 9b. A holder 6 is detachably mounted onto the lower surface of leg 9b by screw bolts 27. Holder 6 has a receiving surface 6a of a substantially semicircular shape for being positioned opposite to semicircular surface 9d. Second support S2 includes a combination of semicircular surface 9d and holder 6. In addition, the shape of receiving surface 6a and surface 9d are not limited to a semicircular arc, but may be any shape acceptable for cooperation with shaft portion 8a.

Shaft portions 8a and 8a' of movable swash plate 8 are supported by legs 9a and 9b. Accordingly, movable swash plate 8 is suspended in the housing for being slantingly moved by way of shaft portions 8a and 8a'. Therefore, sliding resistance or friction created when movable swash plate 8 slantingly moves, is reduced, and the force necessary to move movable swash plate 8 is reduced. Due to the reduced sliding resistance, movable swash plate 8 easily returns to the neutral position. In an embodiment where legs 9a and 9b extend internally from lid 9, legs 9a and 9b can be molded integrally with lid 9. Accordingly, the manufacturing costs are lower. Since movable swash plate 8 is supported by lid 9, this embodiment is particularly adaptable to various types of axle driving apparatuses. For example, movable swash plate 8, in accordance with the invention, can be effectively assembled into a housing. In addition, the invention is adaptable for use in a housing having a joint with surfaces defining a plane perpendicular to a longitudinal direction of the axles as disclosed, for example, in U.S. Pat. No. 4,899,541, thus achieving efficient assembly.

When movable swash plate 8 is assembled with lid 9, shaft portion 8a may be inserted into bore 9c and shaft portion 8a' is then disposed in semicircular surface 9d for being held by holder 6. In addition, it is within the scope of the invention to form first support S1 to be the same as that of second support S2. In particular, at the lower surface of leg 9a, a substantially semicircular surface is formed and a holder having a semicircular receiving surface is mounted opposite to the semicircular surface. Accordingly, the labor required for boring bore 9c can be eliminated and lid 9 with legs 9a and 9b can be manufactured without mechanical processing.

Once movable swash plate 8 is supported by lid 9, arm 29 is connected to shaft portion 8a and fixed by a bolt 28. Thus, assembly of movable swash plate 8 with lid 9 is facilitated.

A biasing spring housed in cylinder block 16 in combination with a hydraulic reaction creates thrust F, which is transferred from each piston 13 to movable swash plate 8 supported by legs 9a and 9b. Thrust F pushes, for example, upwardly pushes movable swash plate 8. Thus, lid 9 bears the force of thrust F by way of shaft portions 8a and 8a' and legs 9a and 9b. More particularly, the lid bears the force of thrust F by way of the upper surfaces of shaft portions 8a and 8a' of movable swash plate 8 and shaft bore 9c of leg 9a and semicircular surface 9d of leg 9b. Hence, there is no need to increase the rigidity of first and second supports S1 and S2 to bear the thrust F because in accordance with the invention, the thrust F is diverted, for example, in one embodiment, to the lid 9.

Figure 15:
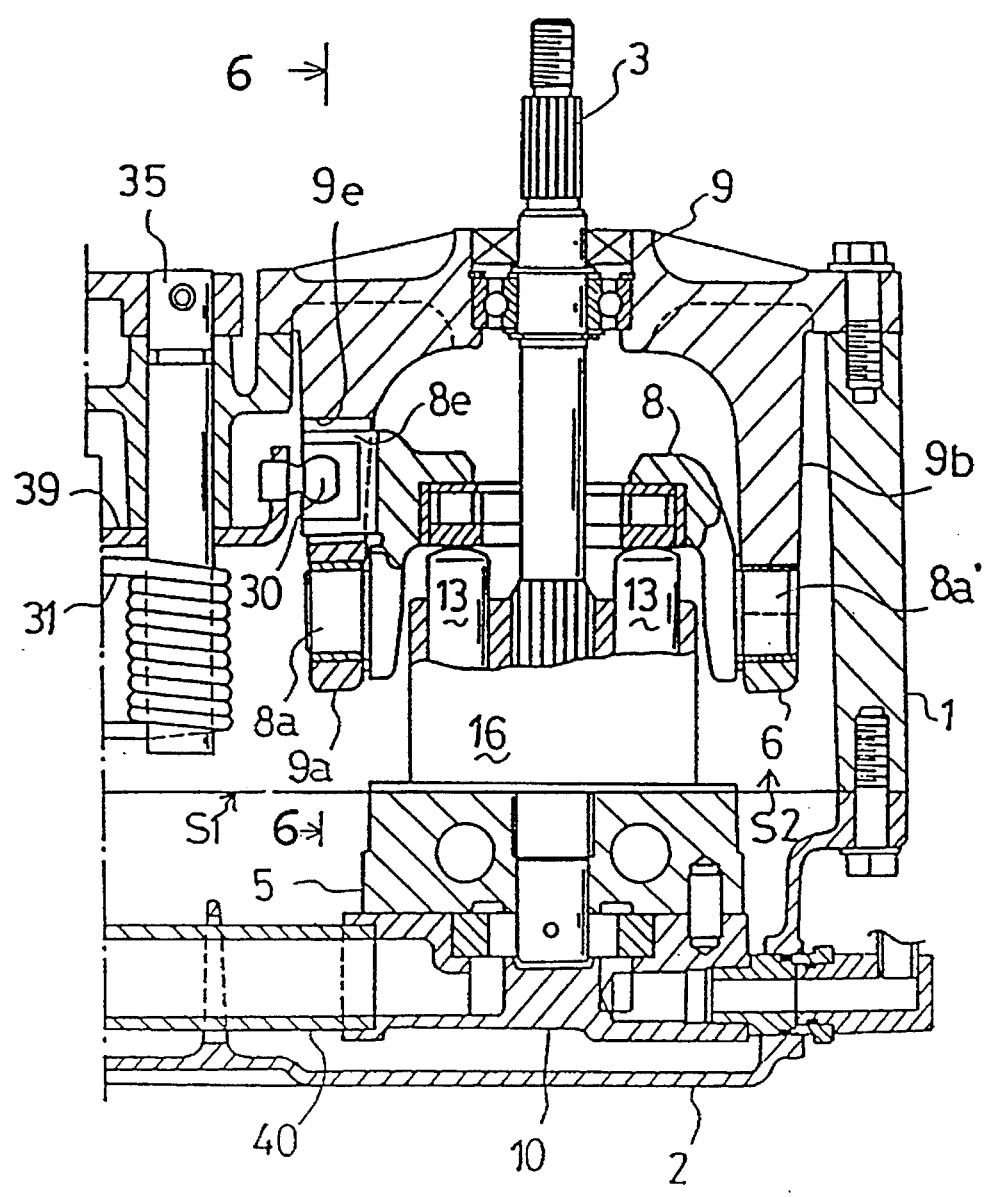
FIG. 15 is a sectional side view of a modified embodiment, which supports the movable swash plate by a lid member.
Figure 16:
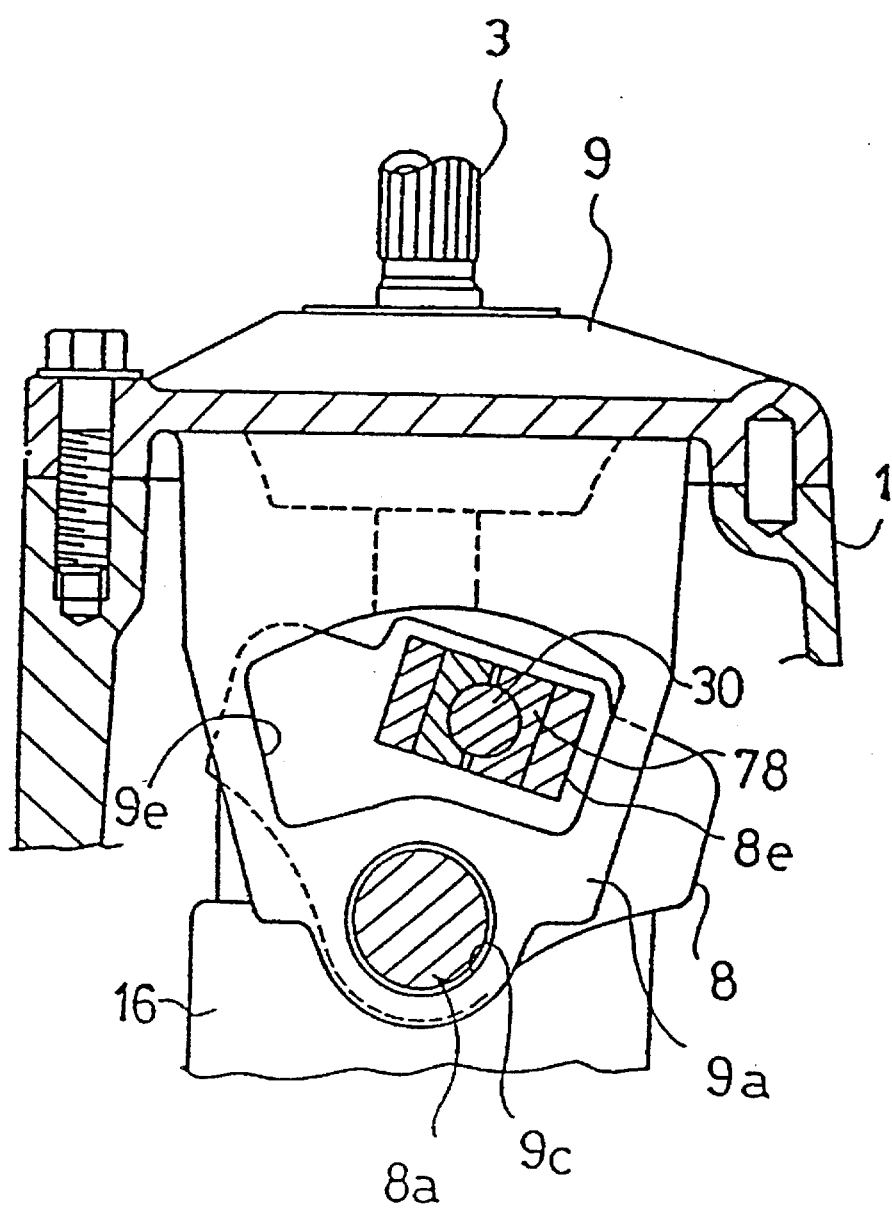
FIG. 16 is a sectional view taken in the direction of the, arrows 6—6 in FIG. 15.

A modified embodiment of the invention where movable swash plate 8 is supported by legs 9a and 9b of lid 9 is shown in FIGS. 15 and 16. In this embodiment, control shaft 35 for rotatably operating movable swash plate 8 is disposed proximate to cylinder block 16. In particular, an arm 8e is provided at one lateral side of movable swash plate 8 in the vicinity of, for example, above shaft portion 8a. Arm 8e is positioned in opening 9e provided in leg 9a. Opening 9e is of a width sufficient to allow for rotation of arm 8e when movable swash plate 8 slantingly moves. Arm 8e engages ball 30 by way of joint blocks 78a and 78b. Thus, swinging arm 39 is connected with movable swash plate 8. Hence, shaft portion 8a does not require extra length beyond the depth of legs 9a and 9b to enable mounting of arm 29 to shaft portion 8a. Thus, control shaft 35 can be disposed proximate to cylinder block 16.

Figure 9:
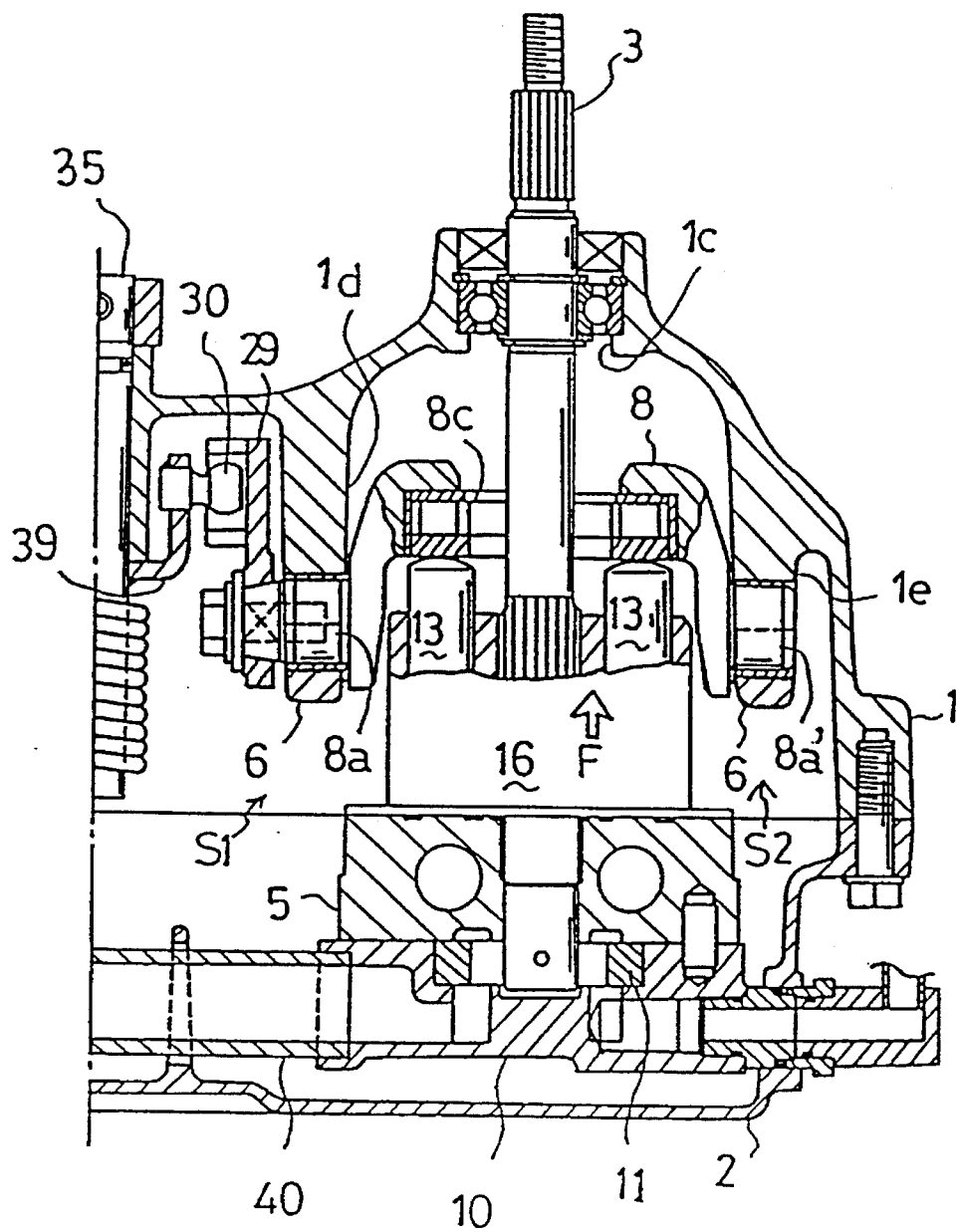
FIG. 9 is a sectional side view of an embodiment for supporting the movable swash plate at an upper half of the housing.
Figure 10:
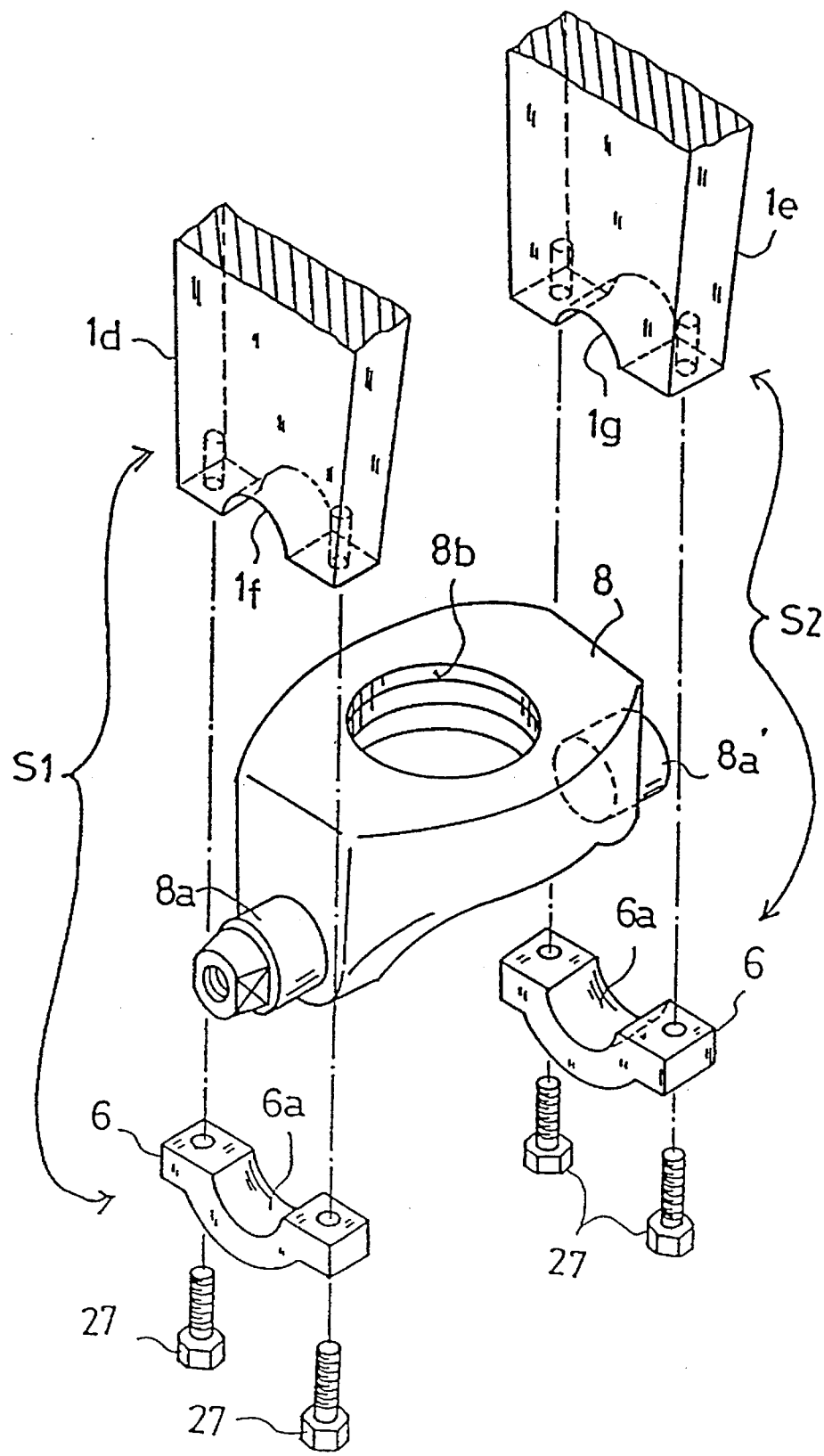
FIG. 10 is a perspective exploded view of the support shown in FIG. 9.

In accordance with another embodiment of the invention, shown in FIGS. 9 and 10, a pair of legs 1d and 1e are integrally extended from inner surfaces of walls, for example, upper walls of the housing and on either side of a shaft bore 1c and extend toward movable swash plate 8 along, for example, parallel to the rotary axis of cylinder block 18. Shaft bore 1c is for journalling input shaft 3 to upper half 1 of the housing. Legs 1d and 1e are formed such that ends, for example, lower ends of legs 1d and 1e are level with each other. Semicircular surfaces 1f and 1g are formed in a portion of the lower end surfaces of legs 1d and 1e respectively. Holders 6 are detachably mounted to the lower end surfaces of legs 1d and 1e by bolts 27 respectively. On a surface, for example, an upper surface of each holder 6 is a semicircular receiving surface 6a for being positioned opposite to semicircular surface 1f or 1g. Accordingly, holder 6 and legs 1d and 1e, and more particularly, receiving surfaces 6a and semicircular surfaces 1f or 1g are connected to form first and second supports S1 and S2 for rotatably supporting shaft portions 8a and 8a'.

In this embodiment, thrust F applied by piston 13 to shaft portions 8a and 8a' on movable swash plate 8 bears on the entire upper half 1 of the housing, which is of high rigidity, by way of semicircular surfaces 1f and 1g of legs 1d and 1e. Hence, when thrust F is increased, it is unnecessary to increase the rigidity of first and second supports S1 and S2 because upper half 1 is capable of bearing thrust F. During assembly, the upper half 1 of the housing is turned over and shaft portions 8a and 8a' of movable swash plate 8 are disposed on semicircular surfaces 1f and 1g of legs 1d and 1e and holders 6 are mounted to legs 1d and 1e, thereby simplifying assembly. Also, when upper half 1 of the housing is molded, legs 1d and 1e can be simultaneously and integrally molded with upper half 1, thereby reducing manufacturing costs.

Figure 11:
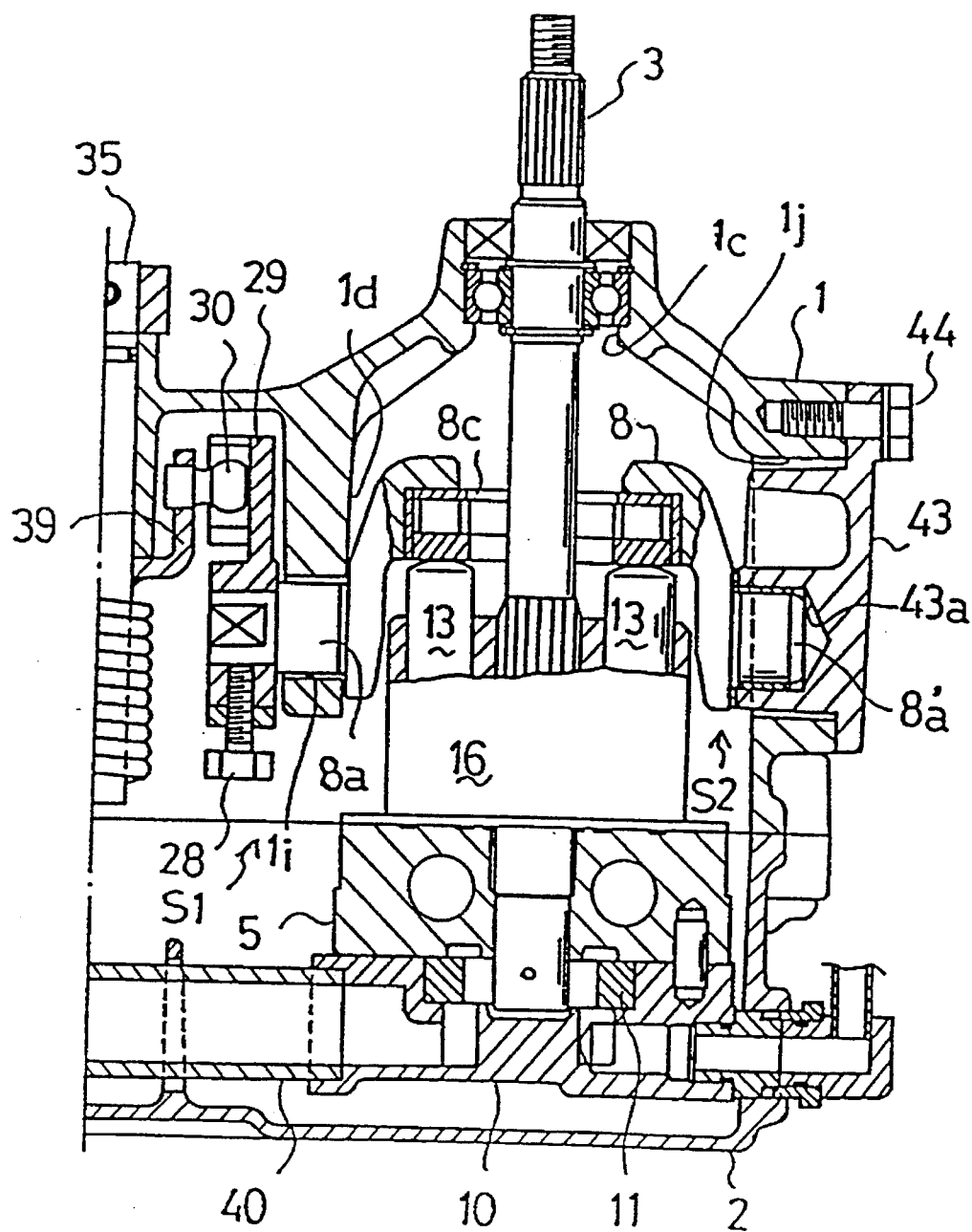
FIG. 11 is a sectional side view of an embodiment of the invention, which supports the movable swash plate at the upper half of the housing.

FIG. 11 is an embodiment in accordance with the invention, in which movable swash plate 8 is supported by upper half 1. First support S1 for holding shaft portion 8a includes a round bore 1i in leg 1d, which extends for example, downwardly extends from the inner surface of the upper wall of upper half 1 of the housing. An end of shaft portion 8a extends beyond bore 1i and is fixed to arm 29. A second support S2 is formed on lid 43 provided at an opening 1j of a wall, for example, a side wall of upper half 1 of the housing. Opening 1j provides access for a cutting tool to enter the housing and is capable of being closed by lid 43. Lid 43 is fixed to the housing by a bolt 44. A round recess 43a concentric with bore 1i, receives and rotatably supports shaft portion 8a'. Thus, opening 1j and lid 43 are provided to enable access to construct or repair first and second supports S1 and S2.

Figure 17:
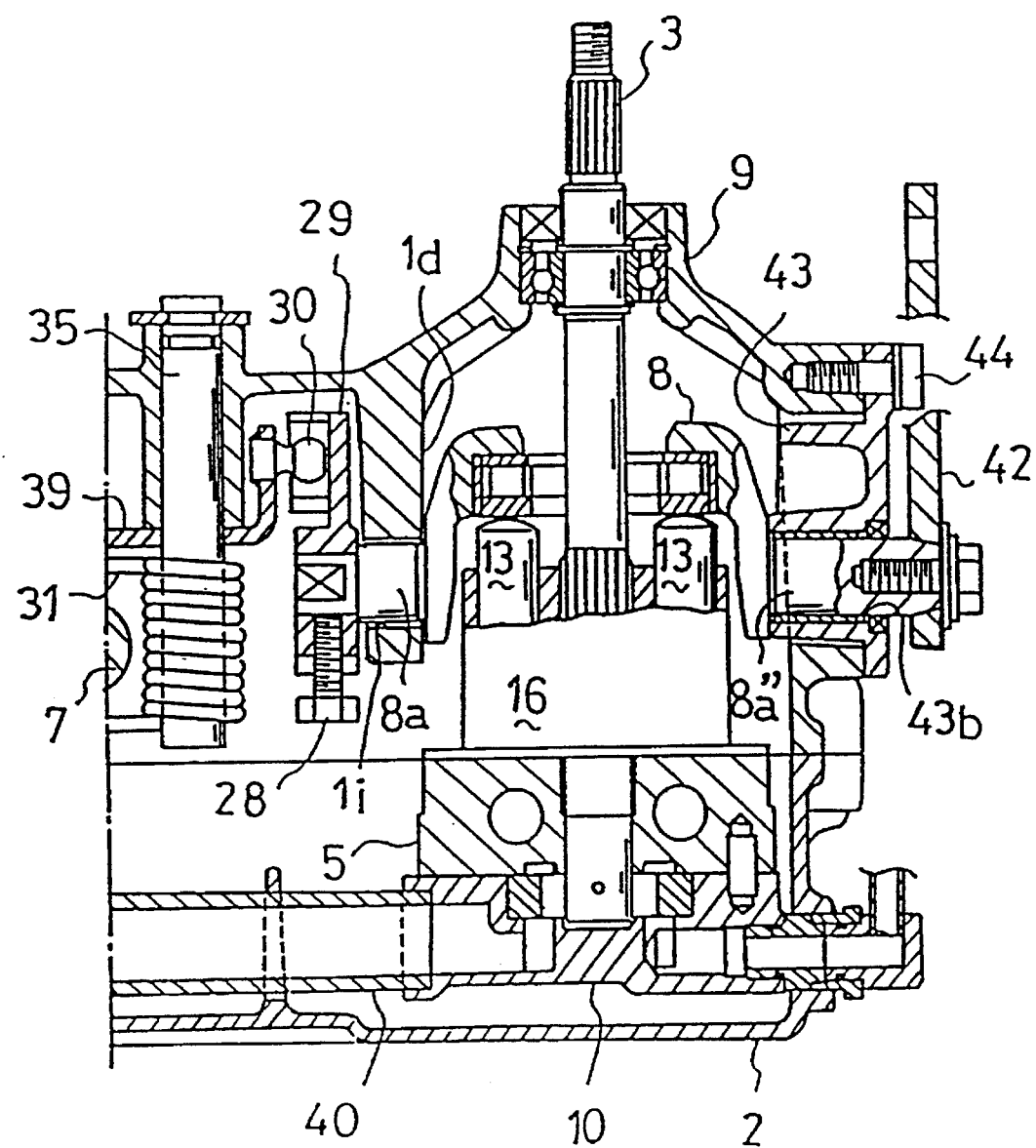
FIG. 17 is a sectional view of another modified embodiment, which is provided outside the housing with a control shaft.

In another embodiment, shown in FIG. 17, lid 43 is formed so that a control arm 42 can be positionally adjusted from the exterior, such as, on the upper surface and the side surface of upper half 1 of the housing. In particular, a round recess 43b in lid 43 is a through bore. Another shaft portion 8a", which is an alternate embodiment of shaft portion 8', for example, an extended version of 8', of movable swash plate 8 is of a sufficient length for being supported in recess 43b. An end of shaft portion 8a" projects beyond a periphery of the housing or lid 43 so that control arm 42 can be fixed shaft portion 8a". Accordingly, when control arm 42 in accordance with this embodiment is rotated for example, where the control arm 42 is on a lateral side of the housing then control arm 42 is longitudinally rotated, the movable swash plate 8 is directly slanted by the shaft portion 8a". Thus, shaft portion 8a simultaneously rotates thereby rotating swinging arm 39 by way of arm 29, ball 30, and joint blocks 78a and 78b. Accordingly, torsion spring 31 exerts a return biasing force on movable swash plate 8 in a direction toward the neutral position. In accordance with an embodiment of the invention, further to shaft portions 8a and 8a' or 8a" supporting movable swash plate 8, shaft portions 8a and 8a' or 8a" function also to transfer the biasing force biased toward the neutral position to movable swash plate 8. Furthermore, shaft portion 8a" functions to slantingly move movable swash plate 8, for example, by control arm 42.

Figure 12:
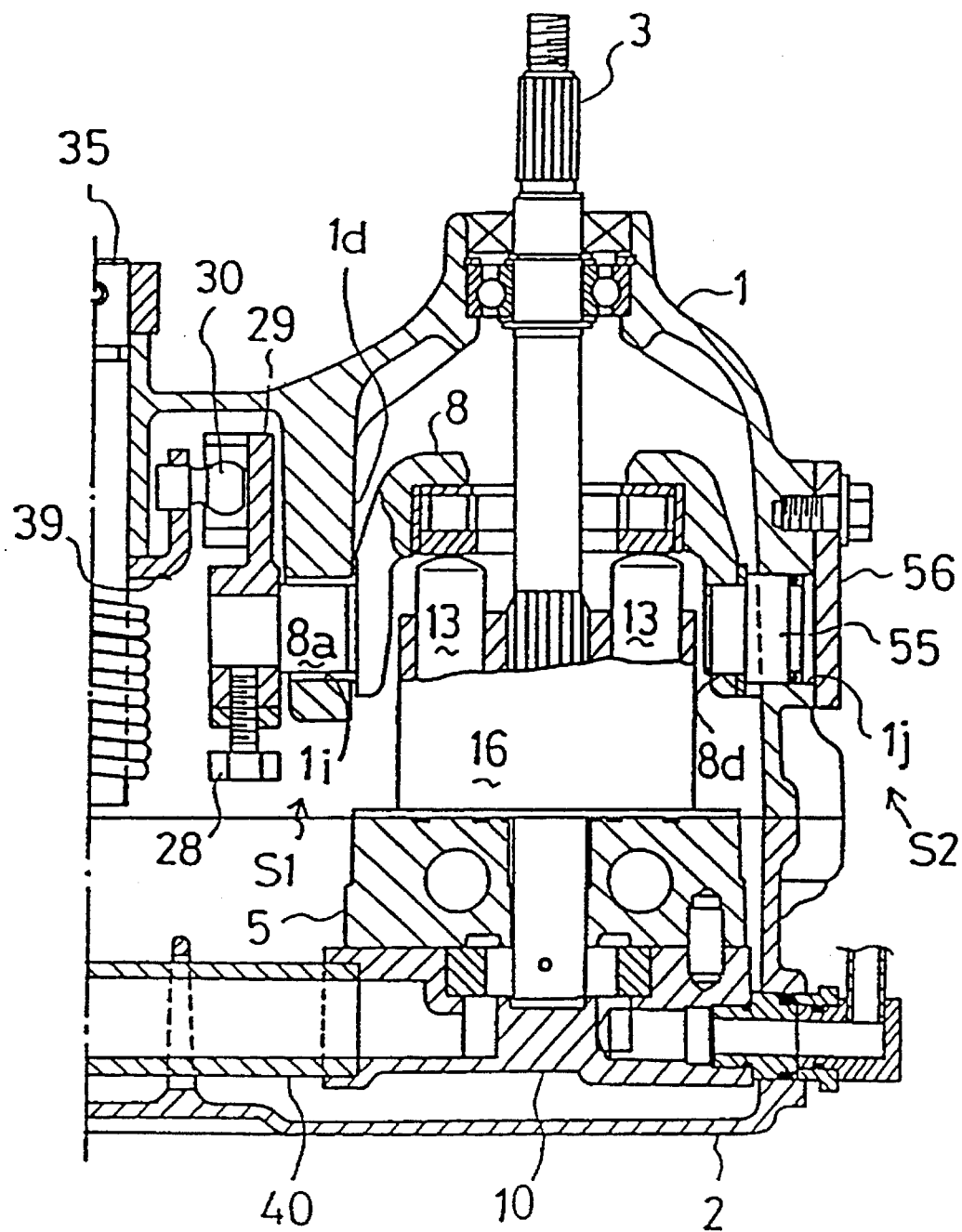
FIG. 12 is a sectional side view of another embodiment of the invention, which supports the movable swash plate at the upper half of the housing.

In another embodiment in accordance with the invention, as shown in FIG. 12, movable swash plate 8 is supported by upper half 1. First support S1, as discussed above for FIG. 17, is formed so that leg 1d extends from upper half 1 of the housing and a bore 1i receives a shaft portion 8a. Second support S2 is formed by a cylindrical member 55 provided at a lid 56 for closing an opening 1j at a wall, for example, a side wall of the housing. In addition, on a surface, for example, a side surface of cylindrical movable swash plate 8 opposite to shaft portion 8a is a cylindrical recess 8d coaxial with shaft portion 8a. The extreme end of cylindrical member 55 is inserted into recess 8d to support movable swash plate 8. Therefore, a single shaft portion 8a on movable swash plate 8 is sufficient because opening 1j and lid 56 are utilized to enable supports S1 and S2 to be simplified in construction.

Figure 13:
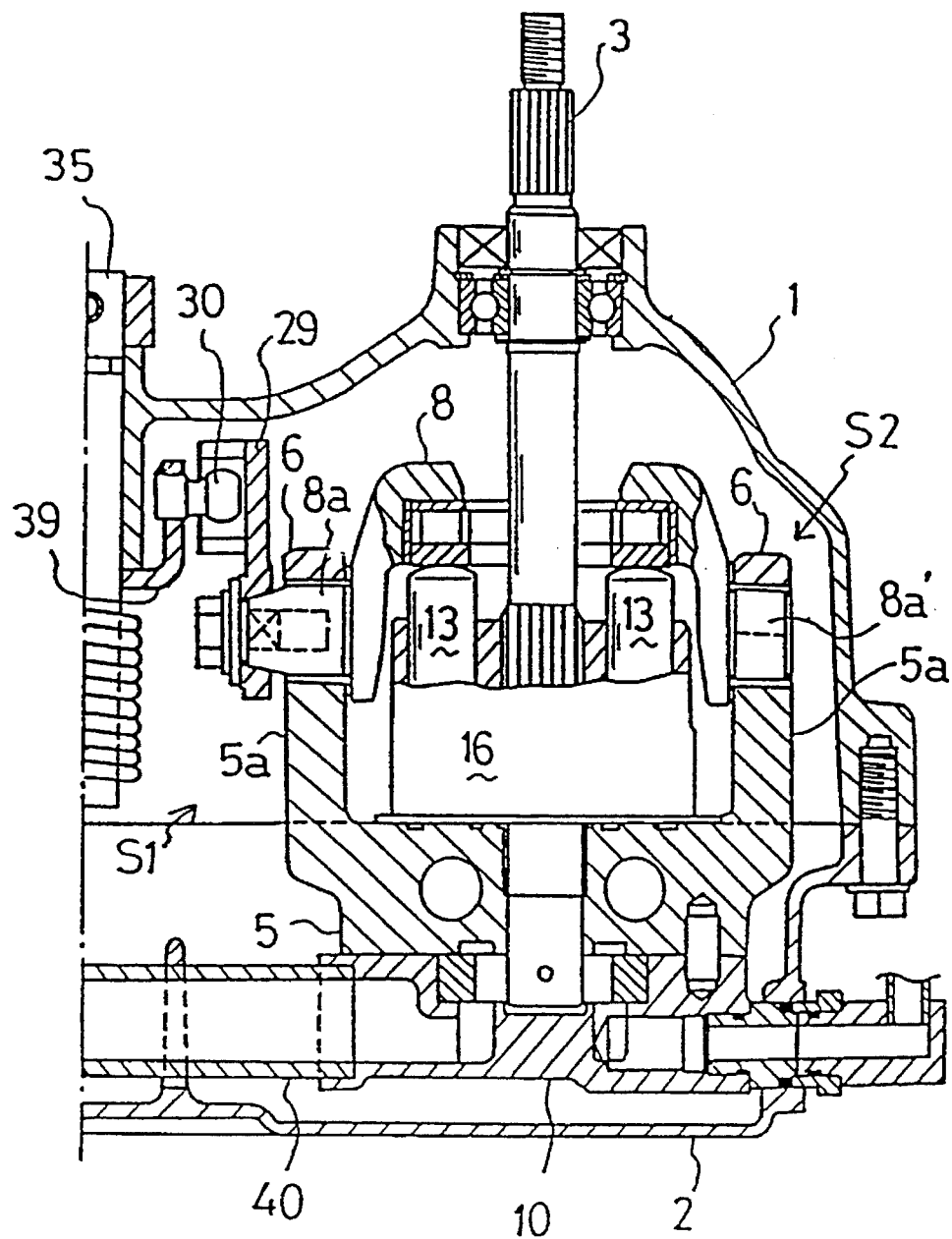
FIG. 13 is a sectional side view of an embodiment of the invention, which supports the movable swash plate in a center section.
Figure 14:
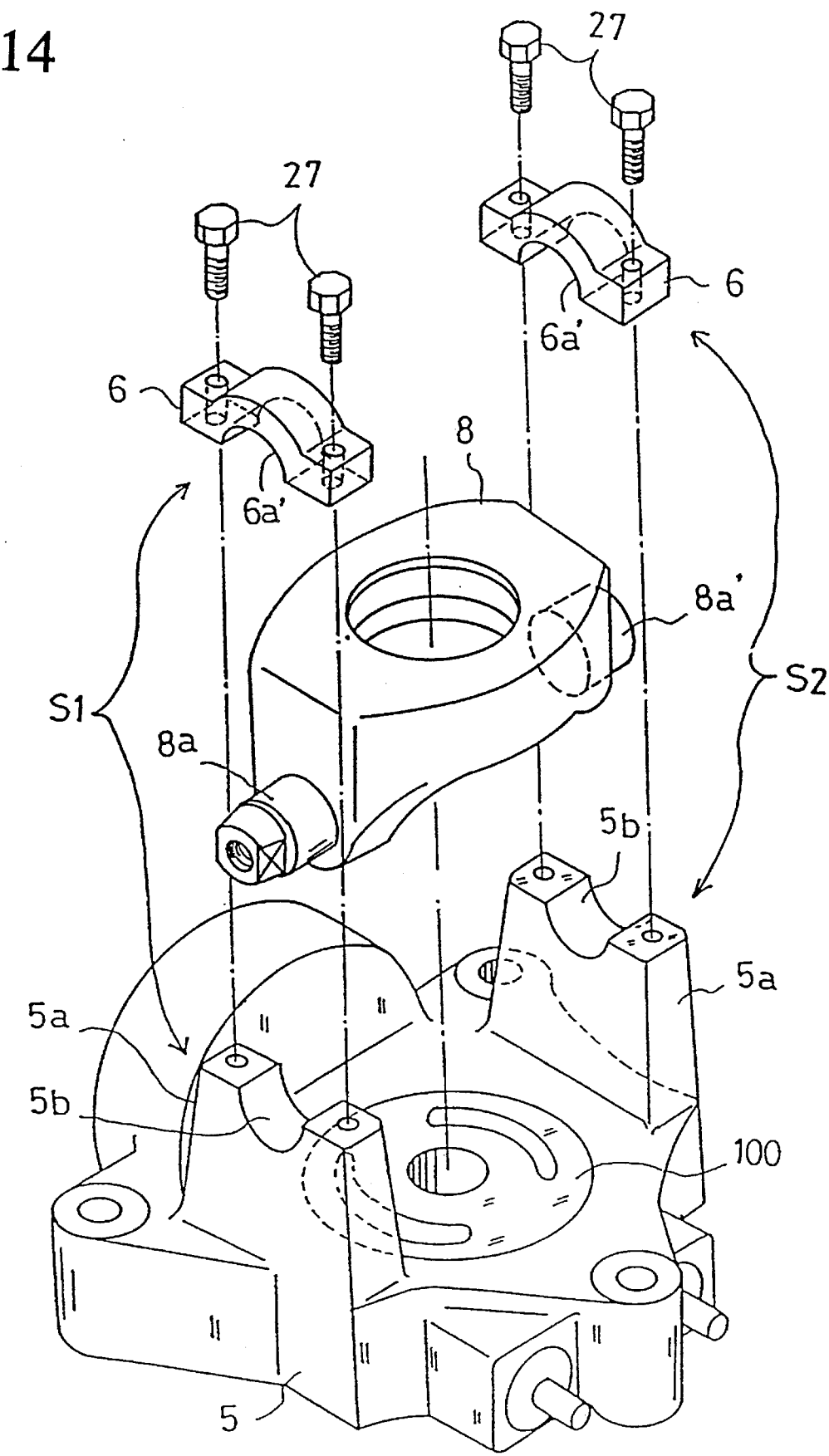
FIG. 14 is a perspective exploded view of a support in the embodiment shown in FIG. 13.

In addition, in another embodiment in accordance with the invention, movable swash plate 8 can be supported by center section 5 fixed into the housing as shown in FIGS. 13 and 14. A pair of legs 5a integrally extend from two sides of a pump setting surface 100 on center section 5 toward movable swash plate 8 along, for example, parallel with the rotary axis of cylinder block 16. Semicircular receiving surfaces 5b are formed on end surfaces, for example, upper end surfaces of legs 5a respectively. Holders 6 are detachable mounted on the upper end surfaces of legs 5a by bolts 27. One surface, for example, a lower surface of holders 6 have a semicircular surface 6a' for being positioned opposite to receiving surfaces 5b respectively. Semicircular surfaces 6a' and receiving surfaces 5b are combined with each other to form first and second supports S1 and S2 for holding shaft portions 8a and 8a'. Hence, when center section 5 is molded, it is possible to simultaneously and integrally mold legs 5a. Thus, lower manufacturing costs are achieved. In addition, the entire variable displacement type hydraulic pump including movable swash plate 8 can be pre-assembled to center section 5 before being assembled in the housing.

In this embodiment, thrust F from pistons 13 is absorbed by center section 5 by way of holders 6. In addition, when movable swash plate 8 is supported by center section 5, first and second supports S1 and S2 on legs 5a can be formed as shown in FIG. 8. In particular, either one or both of holders 6 can be substituted with round bore 9c being disposed in leg 5a.

For slanting the movable swash plates, the above-mentioned various structures and combinations thereof may be applied.

Although the invention has been described with reference to several different embodiments, these embodiments are merely exemplary and not limiting of the invention which is defined by the appended claims.

What is claimed is:

1. An axle driving apparatus, comprising:

a housing having a first section;

an axle disposed within said housing;

a hydrostatic transmission disposed within said housing for driving said axle comprising a displacement hydraulic system having a movable swash plate and a cylinder block;

a shaft disposed on said movable swash plate, said shaft having a longitudinal axis which is along an axis of slanting movement of said movable swash plate; and a leg positioned within said housing extending in a direction parallel to a rotary axis of said cylinder block, said leg member having a support for supporting said shaft on said movable swash plate, wherein said movable swash plate is supported in a suspended position within said housing.

2. An axle driving apparatus according to claim 1, further comprising:

a recess coaxial with said shaft provided on a second side surface of said movable swash plate;

an opening formed in said first section of said housing;

a lid for closing said opening including an inner wall comprising a portion of said inner wall of said housing; and a cylindrical member provided on said lid having a first end rotatably supported in said recess, wherein said shaft is on a first side surface of said movable swash plate, and said support rotatably holds said shaft.

3. An axle driving apparatus comprising:

a housing;

an opening disposed in said housing;

a lid for closing said opening in said housing;

an axle disposed within said housing;

a hydrostatic transmission disposed within said housing for driving said axle, said hydrostatic transmission comprising a displacement hydraulic system having a movable swash plate and a cylinder block;

a shaft projecting from said movable swash plate positioned on an axis of slanting movement of said movable swash plate; and a leg disposed on said lid, positioned within said housing and extending in a direction parallel to a rotary axis of said cylinder block, said leg having a support for supporting said shaft of said movable swash plate, wherein said movable swash plate is supported by said leg in a suspended position within said housing.

4. An axle driving apparatus according to claim 3, wherein said shaft comprises a pair of shafts formed on opposing side surfaces of said movable swash plate, and said leg comprises a pair of legs disposed on said lid, said legs having supports for rotatably supporting said shaft of said movable swash plate.

5. An axle driving apparatus according to claim 4, further comprising:

a holder detachably mounted to an end of said one leg, wherein said pair of shafts are non-rotatable and are integral with said movable swash plate, and wherein said legs are integral with said lid, and at least one of said supports on one of said legs comprises a portion of said one leg.

6. An axle driving apparatus according to claim 3, wherein said hydrostatic transmission further comprises:

another displacement hydraulic system in fluid communication with said displacement hydraulic system.

7. An axle driving apparatus, comprising:

a housing having a first section joined to a second section along a joint;

an axle disposed within said housing;

a hydrostatic transmission disposed within said housing for driving said axle including a displacement hydraulic system having a movable swash plate, a cylinder block and a rotary axis substantially perpendicular to said joint;

a shaft projecting from said movable swash plate positioned on an axis of slanting movement of said movable swash plate; and a leg disposed on an inner wall of said first housing section, said leg positioned within said housing and extending in a direction parallel to a rotary axis of said cylinder block, said leg having a support for supporting said shaft on said movable swash plate, wherein said movable swash plate is supported by said leg in a suspended position within said housing.

8. An axle driving apparatus according to claim 7, wherein:

said shaft comprises a pair of shafts disposed on opposing side surfaces of said movable swash plate, and said leg comprises a pair of legs each having a support for supporting said shaft.

9. An axle driving apparatus according to claim 7, further comprising:

a holder detachably mounted to an end of said leg, wherein said shaft is non-rotatable and is integral with said movable swash plate, wherein said leg is integral with said inner wall of said first section, and wherein said support comprises a portion of said leg.

10. An axle driving apparatus according to claim 7, further comprising:

an opening formed in said first section of said housing;

a lid for closing said opening, wherein said shaft comprises a pair of shafts formed on opposing side surfaces of said movable swash plate; and another support for one of said shafts disposed on an inner wall of said lid, wherein said another support comprises a portion of said inner wall of said housing.

11. An axle driving apparatus, comprising:

a housing;

an axle disposed within said housing;

a hydrostatic transmission disposed within said housing for driving said axle comprising a displacement hydraulic system having a movable swash plate and cylinder block;

a center section separably fixed in said housing, wherein said cylinder block is rotatably and slidably mounted on said center section;

a pair of shafts projecting from said movable swash plate being positioned on an axis of slanting movement of said movable swash plate; and a leg disposed on said center section, positioned within said housing and extending in a direction parallel to a rotary axis of said cylinder block, said leg having a support for supporting said shafts on said movable swash plate, wherein said movable swash plate is supported in a suspended position within said housing.

12. An axle driving apparatus according to claim 11, wherein said pair of shafts are disposed on opposing side surfaces of said movable swash plate, said leg comprises a pair of legs on said center section disposed in a location corresponding to said shafts, and said support of said leg rotatably holds said shafts.

13. An axle driving apparatus according to claim 11, wherein said shafts are non-rotatable and are integral with said movable swash plate, said leg is integral with said center section, and said support comprises an end portion of said leg and a holder is detachably mounted to said end portion.

14. An axle driving apparatus, comprising:

a housing;

axles disposed within said housing;

a hydrostatic transmission disposed within said housing for driving said axles comprising a displacement hydraulic system having a movable swash plate and a cylinder block, a shaft integral with said movable swash plate being positioned on an axis of slanting movement of said movable swash plate, an arm fixed to an end of said shaft portion, and a control shaft rotatably disposed in said housing extending in a direction parallel to said rotary axis of said cylinder blocks, said control shaft having an engaging portion engaging said arm for controlling slanting movement of said movable swash plate; and a leg member positioned in said housing extending in a direction parallel to a rotary axis of said cylinder block, said leg member having a support for supporting said shaft on said movable swash plate, wherein said movable swash plate is supported in an suspended position in said housing.

15. An axle driving apparatus according to claim 14, wherein said hydrostatic transmission further comprises:

another displacement hydraulic system in fluid communication with said displacement hydraulic system.

16. An axle driving apparatus comprising:

a housing;

axles disposed within said housing;

a hydrostatic transmission disposed within said housing for driving said axles comprising at least one displacement hydraulic system having a movable swash plate and a cylinder block, a shaft integral with said movable swash plate being positioned on an axis of slanting movement of said movable swash plate, an arm positioned above said shaft portion on said movable swash plate;

a leg member positioned in said housing extending in a direction parallel to a rotary axis of said cylinder block, said leg member having a support for supporting said shaft on said movable swash plate, wherein said movable swash plate is supported in an suspended position in said housing, said leg member having an opening said arm of said movable swash plate being disposed in said opening; and a control shaft rotatably disposed in said housing extending in a direction parallel to said rotary axis of said cylinder blocks, said control shaft having an engaging portion engaging said arm for controlling slanting movement of said movable swash plate.

17. An axle driving apparatus according to claim 16, wherein said hydrostatic transmission further comprises:

another displacement hydraulic system in fluid communication with said displacement hydraulic system.

18. An axle driving apparatus, comprising:

a housing;

axles disposed within said housing;

a hydrostatic transmission disposed within said housing for driving said axles comprising a displacement hydraulic system having a movable swash plate and a cylinder block, a shaft integral with said movable swash plate being positioned on an axis of slanting movement of said movable swash plate, and an arm fixed to an end of the shaft portion;

a swinging arm connected to said arm for pivoting around an axis parallel to said rotary axis;

a spring in relation with said swinging arm for biasing said movable swash plate to a neutral position;

a control shaft rotatably disposed in said housing extending in a direction parallel to said rotary axis of said cylinder block, said control shaft having an engaging portion engaging said arm for controlling slanting movement of said movable swash plate; and a leg member positioned in said housing extending in a direction parallel to a rotary axis of said cylinder block, said leg member having a support portion for supporting said shaft on said movable swash plate, wherein said movable swash plate is supported in an suspended position in said housing.

19. An axle driving apparatus according to claim 18, wherein said hydrostatic transmission further comprises:

another displacement hydraulic system in fluid communication with said displacement hydraulic system.

20. An axle driving apparatus according to claim 18, wherein said shaft comprises a pair of shafts disposed on opposing side surfaces of said movable swash plate, said arm fixed to said end of said shaft is a first end of a first shaft of said pair of shafts, a second shaft of said pair of shafts comprises a second end extended outwardly from said housing, and a control arm is connected to said second end of said second shaft portion for being rotated.

21. An axle driving apparatus according to claim 20, wherein said hydrostatic transmission further comprises:

another displacement hydraulic system in fluid communication with said displacement hydraulic system.

* * * * *